US006834308B1

(12) United States Patent
Ikezoye et al.

(10) Patent No.: US 6,834,308 B1
(45) Date of Patent: Dec. 21, 2004

(54) METHOD AND APPARATUS FOR IDENTIFYING MEDIA CONTENT PRESENTED ON A MEDIA PLAYING DEVICE

(75) Inventors: Vance E. Ikezoye, Los Gatos, CA (US); James B. Schrempp, Saratoga, CA (US)

(73) Assignee: Audible Magic Corporation, Los Gatos, CA (US)

( * ) Notice: Subject to any disclaimer, the term of this patent is extended or adjusted under 35 U.S.C. 154(b) by 0 days.

(21) Appl. No.: 09/511,632

(22) Filed: Feb. 17, 2000

(51) Int. Cl.[7] .............................................. G06F 15/16
(52) U.S. Cl. ........................ 709/231; 709/217; 709/229
(58) Field of Search ................................ 709/203, 217, 709/219, 238, 227, 231; 713/193, 194; 705/39, 54, 65

(56) References Cited

U.S. PATENT DOCUMENTS

| | | | |
|---|---|---|---|
| 3,919,479 A | 11/1975 | Moon et al. ............... 179/1 SB |
| 4,230,990 A | 10/1980 | Lert, Jr. et al. ............... 455/67 |
| 4,450,531 A | 5/1984 | Kenyon et al. ............. 364/604 |
| 4,677,455 A | 6/1987 | Okajima ...................... 357/38 |
| 4,677,466 A | 6/1987 | Lert, Jr. et al. ............... 358/84 |
| 4,739,398 A | 4/1988 | Thomas et al. ............... 358/84 |
| 4,843,562 A | 6/1989 | Kenyon et al. ............. 364/487 |
| 4,918,730 A | 4/1990 | Schulze ........................ 381/43 |
| 5,210,820 A | 5/1993 | Kenyon ......................... 395/2 |
| 5,283,819 A | 2/1994 | Glick et al. ................... 379/90 |
| 5,437,050 A | 7/1995 | Lamb et al. ................... 455/2 |
| 5,581,658 A | 12/1996 | O'Hagan et al. ............. 395/22 |
| 5,918,223 A | 6/1999 | Blum et al. ..................... 707/1 |
| 6,006,256 A | 12/1999 | Zdepski et al. ............. 709/217 |
| 6,011,758 A | 1/2000 | Dockes et al. ................ 369/30 |
| 6,026,439 A | 2/2000 | Chowdhury et al. ........ 709/233 |
| 6,044,402 A | 3/2000 | Jacobson et al. ........... 709/225 |
| 6,118,450 A | 9/2000 | Proehl et al. ............... 345/349 |
| 6,243,725 B1 * | 6/2001 | Hempleman et al. ....... 715/530 |
| 6,253,193 B1 | 6/2001 | Ginter et al. ................. 705/57 |
| 6,330,593 B1 * | 12/2001 | Roberts et al. ............. 709/217 |
| 6,345,256 B1 * | 2/2002 | Milsted et al. ................. 705/1 |
| 6,385,596 B1 * | 5/2002 | Wiser et al. .................. 705/51 |
| 6,418,421 B1 * | 7/2002 | Hurtado et al. ............... 705/54 |
| 6,449,226 B1 * | 9/2002 | Kumagai .................... 369/47.1 |
| 6,452,874 B1 * | 9/2002 | Otsuka et al. ................ 369/14 |
| 6,477,704 B1 * | 11/2002 | Cremia ........................ 725/35 |
| 6,496,802 B1 * | 12/2002 | van Zoest et al. ............ 705/14 |
| 6,550,011 B1 * | 4/2003 | Sims, III .................... 713/193 |
| 6,591,245 B1 * | 7/2003 | Klug ........................... 705/10 |
| 6,609,105 B2 * | 8/2003 | Van Zoest et al. ............ 705/14 |
| 6,654,757 B1 * | 11/2003 | Stern .......................... 707/101 |

FOREIGN PATENT DOCUMENTS

| | | | |
|---|---|---|---|
| WO | WO 02/15035 A2 | 2/2002 | ........... G06F/17/00 |

OTHER PUBLICATIONS

L. Baum et al., A Maximation Technique Occurring in the Statistical Analysis of Probabilistic Functions of Markov Chains, *The Annals of Mathematical Statistics*,, vol. 41, No. 1 pp. 164–171, 1970 (no month).

A. P. Dempster et al. "Maximum Likelihood from Incomplete Data via the $EM$ Algorithm", *Journal of the Royal Statistical Society, Series B (Methodological)*, vol. 39, Issue 1, pp. 1–38, 1977 (no month).

D. Reynolds et al., "Robust Text–Independent Speaker Identification Using Gaussian Mixture Speaker Models", *IEEE Transactions on Speech and Audio Processing*, vol. 3, No.1, pp. 72–83, Jan. 1995.

* cited by examiner

*Primary Examiner*—David Wiley
*Assistant Examiner*—Phouc Nguyen
(74) *Attorney, Agent, or Firm*—Sierra Patent Group, Ltd.

(57) ABSTRACT

A system and method for identifying media content presented over a media playing device. The media content, such as, such as audio and/or video, is either available digitally or digitally sampled. The media content is sampled to generate a media sample or analytical representation of the media content. The media sample is compared to a collection of sampled (or represented) media content to identify it and to ascertain information related to the sample. This media content-related information is then presented to the user via a display means on the media player. The media player then presents the user specific and related actions that are based upon the information presented and allows the user to directly execute their choice of actions.

15 Claims, 5 Drawing Sheets

METHOD AND APPARATUS FOR IDENTIFYING MEDIA CONTENT PRESENTED ON A MEDIA PLAYING DEVICE

BACKGROUND OF THE INVENTION

1. Field of the Invention

This invention pertains generally to media content identification methods. More particularly, the invention is an apparatus and method for identifying media content presented on a media playing device and presenting media-content related information and/or action to the user of the media playing device.

2. The Prior Art

The use of a data processing means, such as a computer or personal digital assistant (PDA), for playing media content is well known. For example, many users use their personal computer (PC) for playing audio compact disks (CD), normally with the use of a CD-ROM drive, a sound card, and speakers. Other types of media, including various formats of audio and video, are also commonly played using a PC.

With the increasing popularity of the global information network commonly known as the "Internet", various audio and video formats have been introduced to provide live (as well as archived) media broadcasts over the Internet. These broadcasts may be viewed by users connected to the Internet with the use of a PC and the proper client application. For example, Real Networks™ provides Real Player™ (a client application) for playing streaming audio and video content (in Real™ format) which is broadcast over the Internet. Various servers (also connected to the Internet) carry out the operation of making such content available and streaming the appropriate content to users upon request. In this way, Real™ media content may be played by a user using Real Player™ on the user's PC. Like other media client applications, Real Player™ plays audio content via the user's sound card and speakers and video content via the user's video card and monitor (or other viewing device).

Internet radio broadcasts (or webcasts) are also known in the art. In general, Internet radio broadcasts are provided over the Internet by one or more server computers equipped to provide streaming audio content, much like traditional AM or FM radio broadcast. A user that would like to listen to an Internet radio broadcast would use a client application (such as Real Player™, Microsoft™ media player, or Apple QuickTime™ viewer, for example) and direct the client application to the appropriate server computer. The server computer then transmits the media content to the client application via the Internet. The client application receives the media content transmitted from the server computer and plays the content using the user's sound card and speaker.

Internet video broadcasts (another form of webcast) are carried out in a similar fashion to that of Internet radio broadcasts, except video broadcasts typically contain both audio and video content. As such, the audio component is played to the user via a sound card and speakers, while the video component is displayed using a video card and a monitor.

In many cases, media content webcasts will not provide content identifying information, such as song title, artist name or album name, as part of the media broadcast. Other information, such as where the content can be purchased in the form of a CD, DVD (digital video disk) or VHS (video home system) tape, for example, are also typically not included. The primary reason a webcast provider (station) fails to provide such content-related information is that the station does not have real-time access to accurate playlists. For example, it is common for a station disk jockey to make real-time adjustments to the playlist order and timing. Thus current radio station systems do not transmit with or attach content data with the broadcast.

In addition to webcasts, many Internet sites provide archived or prerecorded media content for download and playback on a user's PC. Examples of such content include "wav", "mp3", "mov", and "midi" files, among others. Once these files have been downloaded from the Internet site to the user's PC, the user is able to play back the audio or video using an appropriate client application. Many of these media files, like webcasts, also fail to provide content identifying and other information.

Additionally, PCs often have the ability to play other forms of media content via PC sound card and speakers and/or PC video card and monitor. For example, tuner expansion cards (tuners) which may be inserted into (or interfaced with) a user's PC are presently available (some computers already include such tuners). In either case, "television" (TV) tuners allow a user of the PC to view conventional television, cable or satellite transmissions on the PC monitor and hear the audio via the PC speaker. "Radio" tuners allow a user to hear conventional (FM or AM) radio broadcast using the PC speaker. Conventional TV and radio broadcast also fail to provide rich content-related information to the user.

Other media playing devices such as televisions, radio/stereo systems, and portable audio devices also typically do not provide content-related information on demand for the user. For example, in automobiles, current car stereo systems fail to provide a system and method for identifying the music being played on the stereo. Typically a user would either rely on the disk jockey to identify the artist and song title or call the radio station to ascertain the information.

Accordingly, there is a need for an apparatus and method which provides real-time media content-related information and context specific actions choices to users viewing and/or listening to media content over media playing devices. The present invention satisfies these needs, as well as others, and generally overcomes the deficiencies found in the background art.

BRIEF DESCRIPTION OF THE INVENTION

The present invention is a system and method for identifying media content presented over a media playing device, such as a computer. The system generates a media sample or analytical representation of the media content, such as audio and/or video, played on the media player. The media sample or representation is compared to a database of sampled media content or representations to query and ascertain information related to the sample. This media content-related information is then displayed on the media player.

The invention further relates to machine readable media on which are stored embodiments of the present invention. It is contemplated that any media suitable for retrieving instructions is within the scope of the present invention. By way of example, such media may take the form of magnetic, optical, or semiconductor media. The invention also relates to data structures that contain embodiments of the present invention, and to the transmission of data structures containing embodiments of the present invention.

By way of example only, and not of limitation, the media player may comprise any data processing means or computer executing the present invention including devices carrying out the invention via an embedded system. For example, the media player may comprise cellular or mobile phones, portable media players, and fixed media players including analog broadcast receivers (such as car stereo, home stereos, televisions, for example).

In a first embodiment, the database of sampled media content resides on a "lookup server" which carries out the database query described above. In general, the lookup server is operatively coupled for communication to one or more media players (client) via the Internet as is known in the art. Under this arrangement, the media sample is first communicated from the client to the lookup server before the media sample is compared to the database. Then after the database query is carried out on the lookup server, the content-related information is transmitted to the client for presentation thereon.

According to this embodiment, the system of the present invention generally includes one or more client media players, each operatively coupled for communication to a lookup server. As noted above, the lookup server is generally connected to the client media players via an Internet connection, although any suitable network (including wired or wireless) connection may also be used.

For example, the client media player may comprise a computer. The client computer typically plays audio files via a sound card and speakers. Video files are played via a video card and a monitor. The client computer has executing thereon a "client engine" software application comprising a sampling unit, a media intercept unit (intercept unit), and a user-interface.

By way of example, and not of limitation, the intercept unit carries out the operation of monitoring the client computer for media content presented thereon. In general, the intercept unit carries out the operation of monitoring audio signals transmitted to the sound card and/or video signals transmitted to the video card. The intercept unit may also monitor the operations of other hardware suitable for communicating audio and/or video signals, such as USB (universal serial bus) and IEEE (Institute of Electrical and Electronics Engineers) standard 1394 connections, for example. Preferably, the intercept unit maintains a FIFO (first in first out) buffer of fixed size (150 seconds, for example) containing media content played on the client.

The sampling unit carries out the operation of creating a media sample of the media content played on the client computer in order to represent and identify the media content. In general, the sampling unit creates a sample from the FIFO buffer maintained by the intercept unit. The sampling unit may create media samples according to a predetermined or user-defined interval or upon the request of the user of the client computer. User request may be received via commands issued using the user-interface. In general, the media sample created by the sampling unit comprises a "digital fingerprint" or "digital signature" using conventional digital signal processing known in the art. For example, a sound file may be sampled according to its acoustic/perceptual features over time. It is noted that "media sample" is defined herein to include actual recordings of the media content and/or analytical representations of the media content. The media sample is then transmitted to the lookup server for further processing, as described in further detail below.

The user interface carries out the operation of receiving commands from a user of the client computer, and displaying content-related information to the user. As noted above, a user may issue a request for content-related information via the user-interface. This request is communicated to the sampling unit for further processing. As described above, in response to this request, the sampling unit creates a sample of the media content being played on the client computer and transmits the sample to the lookup server for further processing. In response, the lookup server provides the information related to the media sample to the client computer. This content-related information is received by the user interface which then displays the received information to the user of the client computer.

The content-related information returned from the lookup server may also be used for a plurality of purposes including, for example, generating a log of the user activity, providing an option to purchase media to the user, and displaying the content-related information on the media playing device, among others.

The lookup server has executing thereon a "server engine" software application comprising a lookup unit, and a log unit. The lookup unit is further coupled to a media database, and the log unit is coupled to a log database. While the present invention describes the lookup server as a single machine, a group or cluster of server machines may be used to carry out the tasks of the lookup server described herein to thereby balance the load between several machines as is known in the art.

The lookup unit carries out the operation of receiving media samples from client computers and performing database queries on the media database to ascertain content information related to the media sample provided. This content-related information may include such information as song title, artist, album name, for example. The content-related information may also include product fulfillment information, such as how and where to purchase media containing the media sample, advertising banners, and/or promotional offers, for example. This content-related information is transmitted back to the client computer for further processing thereon.

The log unit caries out the operation of tracking media requests made by the users of the client computers to the lookup server. The log unit maintains a plurality of information related to the requests made by the user including, for example, media type, genre or category. This user information is maintained in the log database.

The source of the media content played on the client computer includes conventional media sources such as Internet sources or Webcasts, including streaming media and archived media. The media content source may also be audio CDs, DVD, or other formats suitable for presentation on media playing devices, such as the client computer.

In a second embodiment of the present invention, the database of sampled media content resides within the client computer. The database resides on conventional storage medium, such a computer memory, a hard drive, CD-ROM, or other appropriate storage medium. Under this arrangement, the database query is carried out "locally" on the computer playing the media content. It will be readily apparent to those skilled in the art that various other topological arrangements of the system elements (including the location of the database) may be used with the invention without departing from the scope and spirit of the invention.

An object of the invention is to provide an apparatus and method for identifying media content presented over a media playing device which overcomes the deficiencies of the prior art.

Another object of the invention is to provide an apparatus and method for identifying media content presented over a media playing device which does not require the media content provider to provide content-related information.

Further objects and advantages of the invention will be brought out in the following portions of the specification, wherein the detailed description is for the purpose of fully disclosing the preferred embodiment of the invention without placing limitations thereon.

BRIEF DESCRIPTION OF THE DRAWINGS

The present invention will be more fully understood by reference to the following drawings, which are for illustrative purposes only.

DETAILED DESCRIPTION OF THE PREFERRED EMBODIMENTS

Persons of ordinary skill in the art will realize that the following description of the present invention is illustrative only and not in any way limiting. Other embodiments of the invention will readily suggest themselves to such skilled persons having the benefit of this disclosure.

Figure 1:
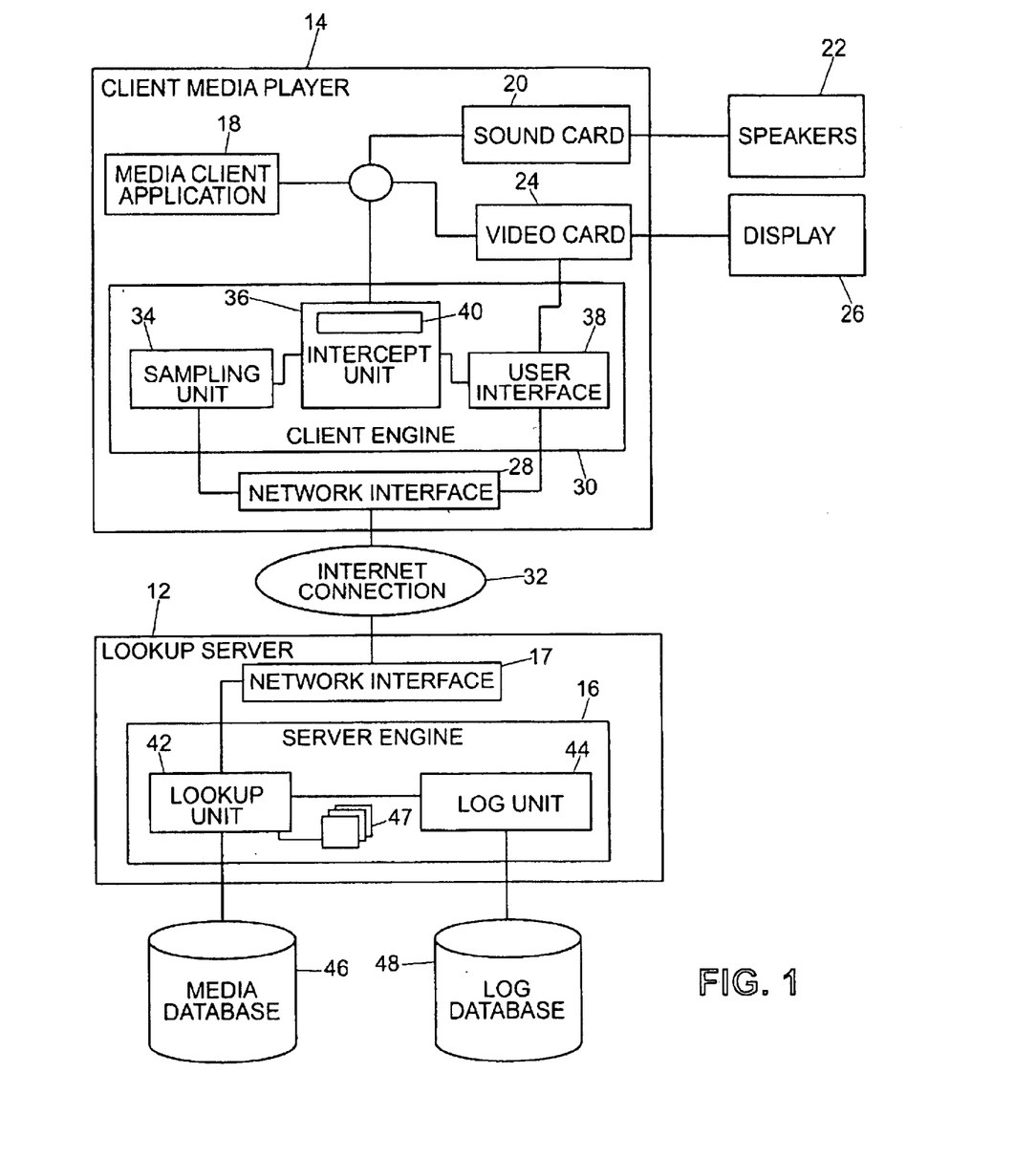
FIG. 1 is a functional block diagram of a media content identifying system in accordance with the invention.
Figure 2:
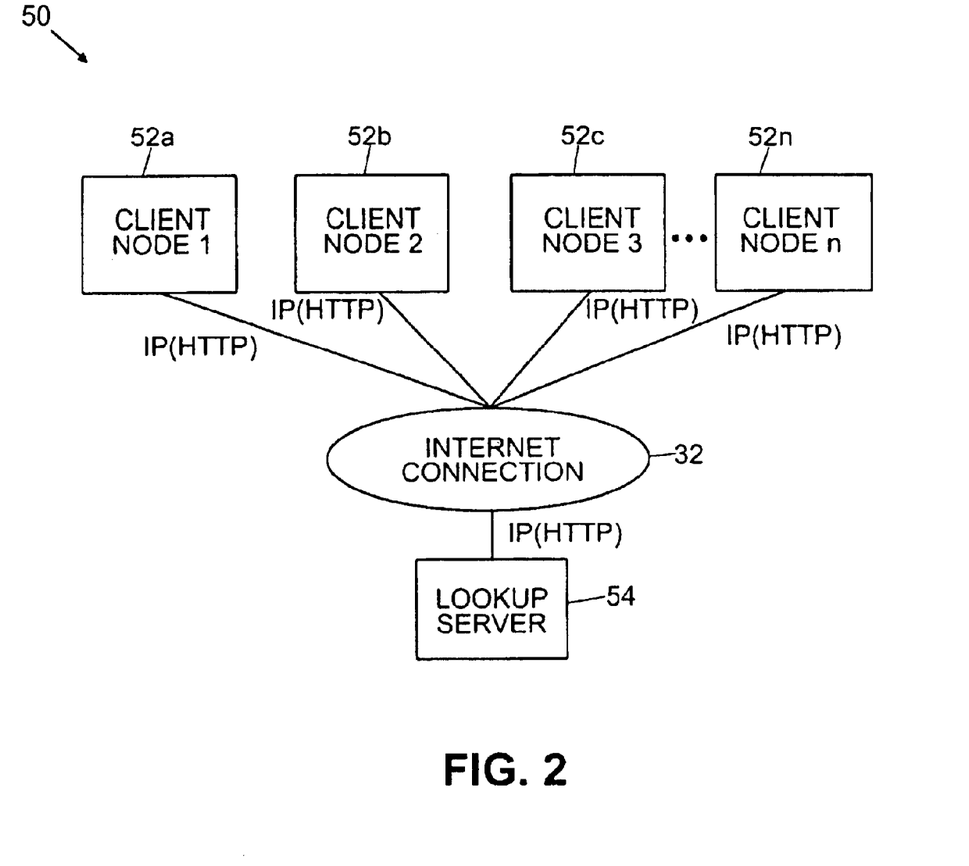
FIG. 2 is a functional block diagram of a media content identifying system having a plurality of client nodes in accordance with the invention.
Figure 3:
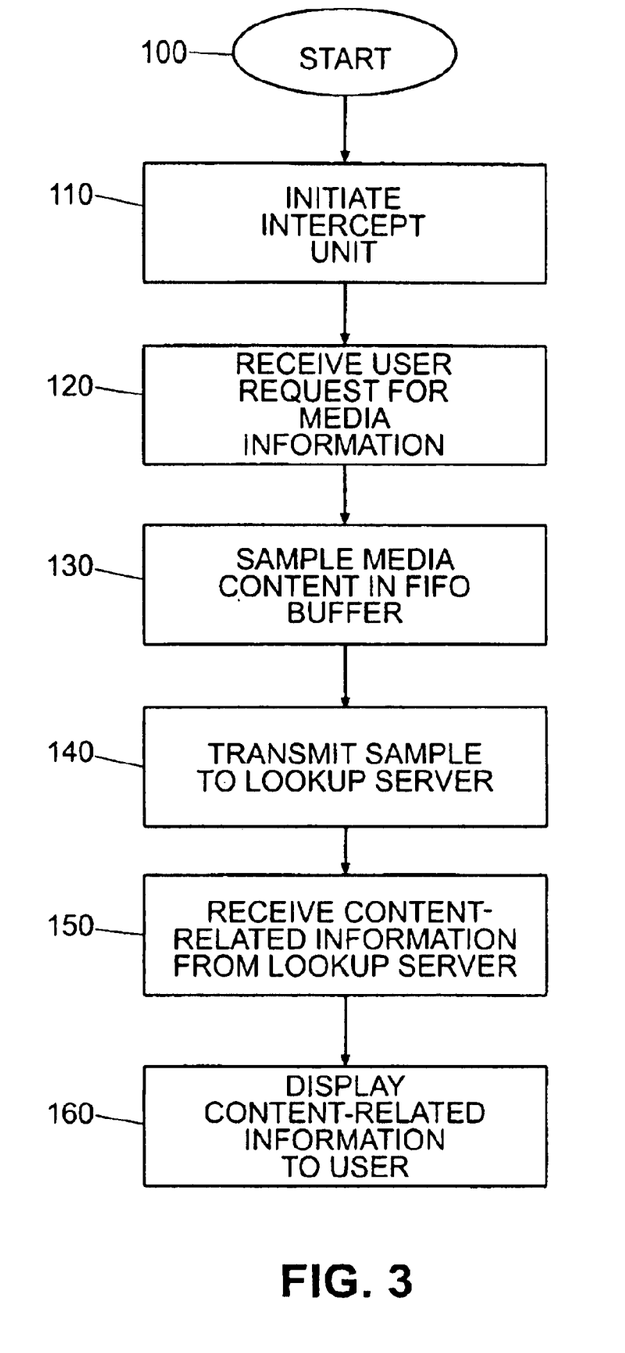
FIG. 3 is a flow chart showing generally the processes associated with the client engine in accordance with the invention.
Figure 4:
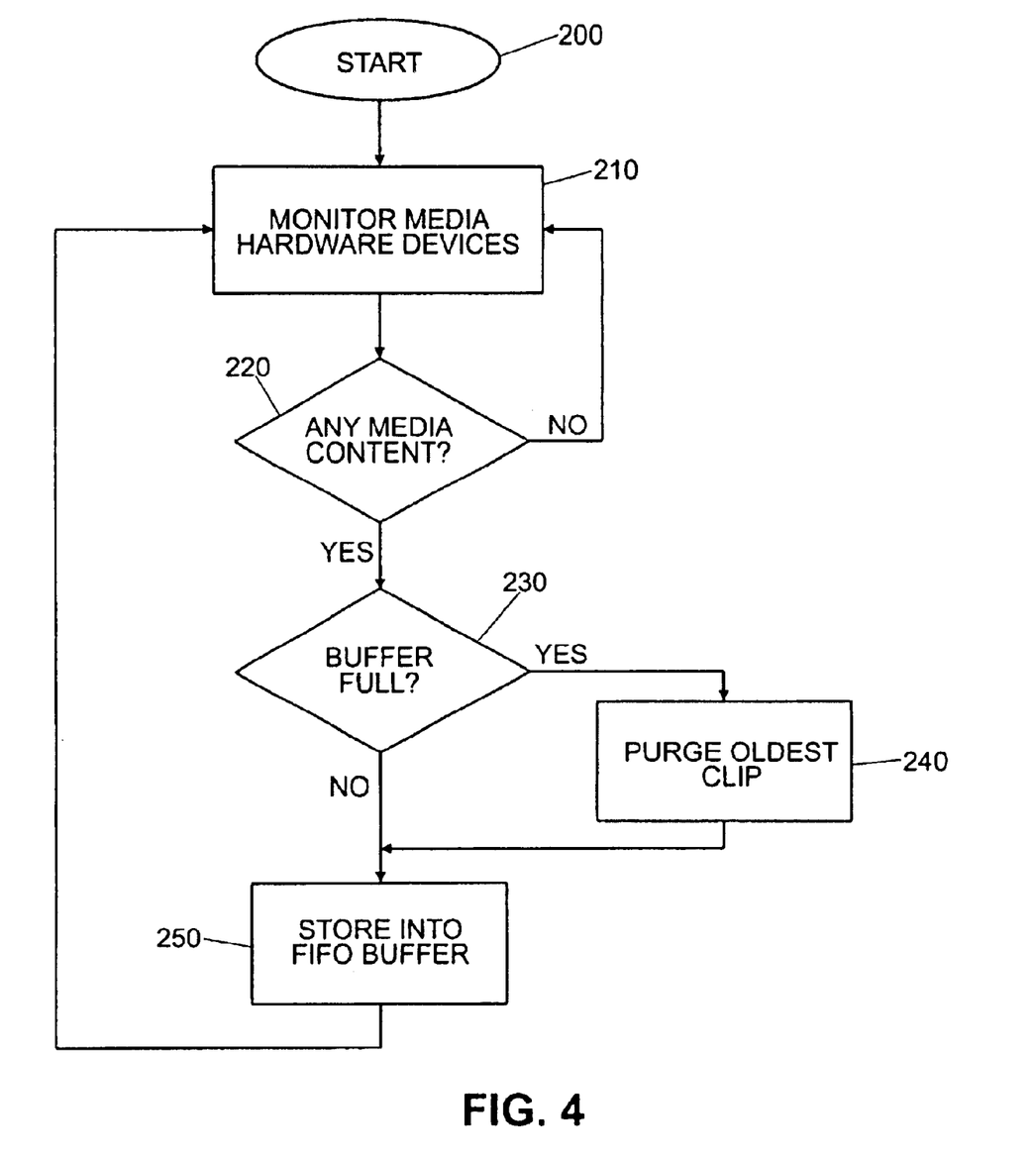
FIG. 4 is flow chart showing generally the processes associated with the media intercept unit in accordance with the invention.
Figure 5:
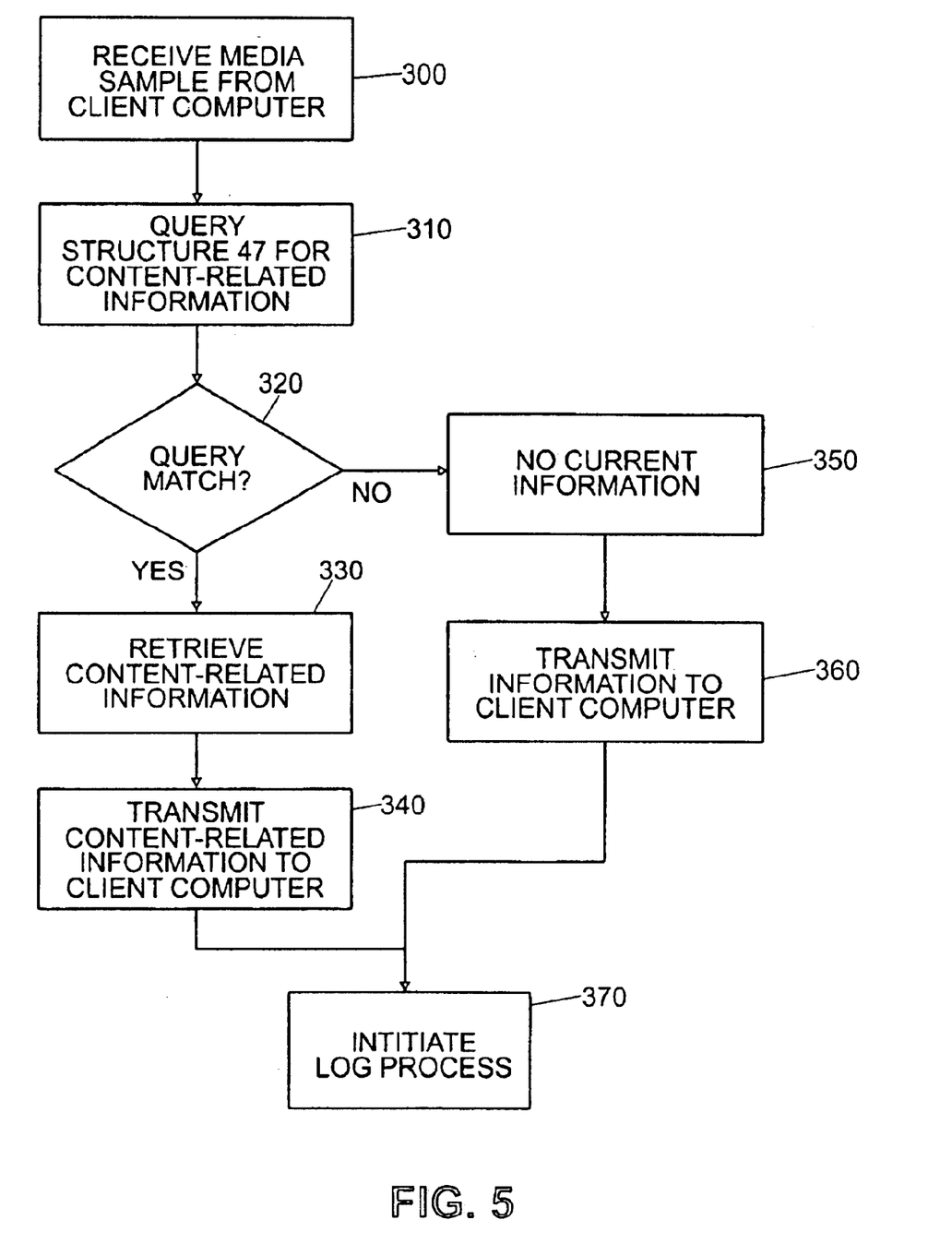
FIG. 5 is flow chart showing generally the processes associated with the server engine in accordance with the invention.

Referring more specifically to the drawings, for illustrative purposes the present invention is embodied in the apparatus shown FIG. 1 and FIG. 2 and the method outlined in FIG. 3 through FIG. 5. It will be appreciated that the apparatus may vary as to configuration and as to details of the parts, and that the method may vary as to details and the order of the acts, without departing from the basic concepts as disclosed herein. The invention is disclosed generally in terms of an apparatus and method for media content identification on a personal computer, although numerous other uses for the invention will suggest themselves to persons of ordinary skill in the art.

Referring first to FIG. 1, there is generally shown a functional block diagram of a media content identifying system 10 in accordance with the invention. The system 10 comprises a lookup server 12 and at least one client media player 14. The lookup server 12 can be any standard data processing means or computer, including a minicomputer, a microcomputer, a UNIX® machine, a mainframe machine, a personal computer (PC) such as INTEL® based processing computer or clone thereof, an APPLE® computer or clone thereof or, a SUN® workstation, or other appropriate computer. Lookup server 12 generally includes conventional computer components (not shown), such as a motherboard, central processing unit (CPU), random access memory (RAM), hard disk drive, display adapter, other storage media such as diskette drive, CD-ROM, flash-ROM, tape drive, PCMCIA cards and/or other removable media, a monitor, keyboard, mouse and/or other user interface means, a modem, and/or other conventional input/output devices. Lookup server 12 also includes a Network Interface 17 for communication with other computers using an appropriate network protocol.

Lookup server 12 has loaded in its RAM a conventional server operating system (not shown) such as UNIX®, WINDOWS® NT, NOVELL®, SOLARIS®, or other server operating system. Lookup server 12 also has loaded in its RAM server engine software 16, which is discussed in more detail below.

Client media player 14, may comprise a standard computer such as a minicomputer, a microcomputer, a UNIX® machine, mainframe machine, personal computer (PC) such as INTEL®, APPLE®, or SUN® based processing computer or clone thereof, or other appropriate computer. As such, client media player 14 is normally embodied in a conventional desktop or "tower" machine, but can alternatively be embodied in a portable or "laptop" computer, a handheld personal digital assistant (PDA), a cellular phone capable of playing media content, a dumb terminal playing media content, a specialized device such as Tivo® player, or an internet terminal playing media content such as WEBTV®, among others. As described above, client media player 14 may also comprise other media playing devices such as portable stereo system, fixed stereo systems, and televisions suitable for use with embedded systems carrying out the operations of the client engine as described further below.

Client media player 14 also includes typical computer components (not shown), such as a motherboard, central processing unit (CPU), random access memory (RAM), hard disk drive, other storage media such as diskette drive, CD-ROM, flash-ROM, tape drive, PCMCIA cards and/or other removable media, keyboard, mouse and/or other user interface means, a modem, and/or other conventional input/output devices.

Client media player 14 also has loaded in it RAM an operating system (not shown) such as UNIX®, WINDOWS® 98 or the like. Client media player 14 further has loaded in RAM a media client application program 18 such as Real Player™, Windows™ Media Player, Apple Quicktime™ Player, or other appropriate media client application for playing audio and/or video via client media player 14. Client media player 14 also has loaded in its RAM client engine software 30, which is discussed in more detail below.

Client media player 14 further includes a conventional sound card 20 connected to speakers 22. As is known in the art, the media client application 18 will generally play audio signals through the sound card device 20 and speakers 22. For example, audio streams, audio files, audio CDs, and other audio sources are communicated from the client application 18 to the sound card 20 for output. The sound card 18 then produces the audio signal via speakers 22.

Client media player 14 also includes a conventional video card 24 connected to a display means 26. As is known in the art, the media client 18 will generally play video content through the video card 24, which then produces an appropriate video signal suitable for display on the display means 26. The display means 26 may be a standard monitor, LCD, or other appropriate display apparatus. Client media player 14 also includes a Network Interface 28 for communication with other computers using an appropriate network protocol. The network interface 28 may comprise a network interface card (NIC), a modem, ISDN (Integrated Services Digital Network) adapter, ADSL (Asynchronous digital subscriber line) adapter or other suitable network interface.

Client media player 14 is networked for communication with lookup server 12. Typically, client media player 14 is operatively coupled to communicate with lookup server 12 via an Internet connection 32 through a phone connection using a modem and telephone line (not shown), in a standard fashion. The user of client media player 14 will typically dial the user's Internet service provider (ISP) (not shown) through the modem and phone line to establish a connection between the client media player 14 and the ISP, thereby establishing a connection between the client media player 14 and the Internet 32. Generally, lookup server 12 is also connected to the Internet 32 via a second ISP (not shown), typically by using a fast data connection such as T1, T3, multiple T1, multiple T3, or other conventional data connection means (not shown). Since computers connected to the Internet are themselves connected to each other, the Internet 32 establishes a network communication between client media player 14 and server 12. Generally, client media player 14 and lookup server 12 communicate using the IP (internet protocol). However, other protocols for communication may also be utilized, including PPTP, NetBEUI over TCP/IP, and other appropriate network protocols.

Client media player 14 and server 12 can alternatively connect to the Internet 32 using a network means, wireless means, satellite means, cable means, infrared means or other means for establishing a connection to the Internet, as alternatives to telephone line connection. Alternative means for networking client media player 14 and server 12 may also be utilized, such as a direct point to point connection using modems, a local area network (LAN), a wide area network (WAN), wireless connection, satellite connection, direct port to port connection utilizing infrared, serial, parallel, USB, FireWire/IEEE-1394, ISDN, DSL and other means known in the art.

In general, client engine 30 is a software application executing within the client media player 14. However, client engine 30 may also be an embedded system carrying out the functions described herein and suitable for use with various media player platforms. Client engine 30 comprises a sampling unit 34, an intercept unit 36, and a user interface 38.

The intercept unit 36 carries out the operation of monitoring the client media player 14 for media content presented thereon, typically by media client application 18, but may be from any media source. In operation, the intercept unit 36 monitors audio signals transmitted from the media client 18 to the sound card 20 and/or video signals transmitted from the media client 18 to the video card 24. The intercept unit 36 may also monitor the operations of other hardware (not shown) suitable for communicating audio and/or video signals, such as USB, IEEE standard 1394 connections, and analog inputs devices (such as microphones). For example, in a media player comprising a mobile stereo system, the intercept unit 36 intercepts the audio signal played on thereon.

Preferably, the intercept unit 36 maintains a FIFO (first in first out) buffer 40 of fixed size (150 seconds, for example) for storing media content played on the client media player 14, and from which media samples are created by sampling unit 34. The operation of the intercept unit is further described below in conjunction with FIG. 4.

The sampling unit 34 carries out the operation of creating a media sample of the media content played on the client media player 14. In operation, the sampling unit 34 creates a media sample from the FIFO buffer 40 maintained by the intercept unit 36. The sampling unit 34 may create media samples according to a predetermined or user-defined interval or upon the request of user of the client media player 14. For example, user requests may be received via commands issued using the user-interface 38.

As noted above, the media sample created by the sampling unit 34 typically comprises a "digital fingerprint" using conventional digital signal processing known in the art. For example, a sound file may be sampled according to its acoustic/perceptual features over time. The media sample generated by sampling unit 34 is then transmitted to the lookup server 12 for further processing, as described in further detail below.

The user interface 38 carries out the operation of receiving commands from a user of the client media player 14, and displaying content-related information to the user. The user interface 38 may be any conventional interfaces including, for example, a graphical user interface (GUI), a command line user interface (CLUI), a voice recognition interface, a touch screen interface, a momentary contact switch on a stereo system, or other appropriate user interface.

In operation, a user may issue a request for content-related information via the user-interface 38. This request is communicated to the sampling unit 34 for further processing. As described above, in response to such a request, the sampling unit 34 creates a media sample of the media content being played on the client media player 14 and transmits the sample to the lookup server 12 for further processing. In response, the lookup server 12 provides the information related to the media sample, if available, to the client media player. This content-related information is received by the user interface 38 which then displays the received information to the user of the client media player 14.

The server engine 16 is a software application executing within the lookup server 12. Server engine comprises a lookup unit 42 and a log unit 44. Lookup unit 42 is operatively coupled for communication with a media database 46. Log unit 44 is operatively coupled for communication with a log database 48.

The lookup unit 42 carries out the operation of receiving media samples from the client media player 14 and comparing the media samples to a collection of sampled media content (reference samples). The collection of reference samples will typically reside in an in-memory structure (designated 47). Upon initialization of the lookup unit 42, the collection of reference samples from the media database 46 is stored in the in-memory structure 47.

The lookup unit 42 sequentially compares each reference sample in structure 47 to the media sample provided by the media player 14. The lookup unit will cut the media sample into a series of overlapping frames, each frame the exact size of the particular reference sample under examination. The lookup unit 42 will then compare the reference sample to every possible "frame" of information within the media sample and compute a "distance" between each frame and the reference sample. This process repeats for each reference sample. The reference sample which has the smallest distance to any frame in the sample is considered for a match. If this distance is below a predefined threshold, a match is considered to be found.

When a match is determined, the information related to the matching record is returned to the client media player for presentation thereon. This content-related information may include such information as song title, artist, and album name, for example. The content-related information may also include product fulfillment information, such as how and where to purchase media containing the media sample, advertising banners, and/or promotional offers, for example.

This content-related information is transmitted back to the client media player 14 for further processing thereon.

The log unit 44 caries out the operation of tracking media requests made by the users of the client media player 14 to the lookup server 12. The log unit 44 maintains a plurality of information related to the requests made by the user including, for example, media type, genre or category. This user information is maintained in the log database 48

Media database 46 and log database 48 comprise conventional relational database storage facilities. Thus, media database 46 may comprise one or more tables (not shown) for storing data associated with the media content samples and related content-specific information (song name, title, album name, etc.). In general, another computer (not shown) may be connected to the lookup server 12 for entering the content-specific media information into the media database 46. Log database 46 may comprise one or more tables (not shown) for storing data associated with users and the user's related media content requests.

Referring now to FIG. 2, there is generally shown a functional block diagram of a media content identifying system 50 having a plurality of client nodes in accordance with the invention.

System 50 comprises a lookup server 54 operatively coupled for communication with a plurality of client media players 52a through 52n via Internet connection 32. System 50 operates in substantially the same manner as system 10 described above. That is, lookup server 54 operates in the same manner as lookup server 12, and clients 52a through 52n operate in the same manner as client media player 14. However, in system 50, lookup server 12 handles a plurality of media sample identification requests from the client 52a through 52n.

As depicted in FIG. 2, clients 52a through 52n communicate with lookup server 54 using the HTTP (hypertext transfer protocol) over IP. More particularly, the media sample signal generated by each client 52a through 52n is wrapped using a transport protocol before transmitted over HTTP to lookup server 54 for processing. When lookup server 54 receives the HTTP transmission from the client media player, a transport protocol converts ("unwraps") the signal for processing therein by the server engine. Likewise, before transmitting content-related information retrieved from the media database to the appropriate client media player, the information is first wrapped using the transport protocol. The content-related information may be communicated using "XML" tags, or other appropriate programming, scripting, or markup language. The appropriate client media player upon receiving the transmission from the lookup server 54 unwraps the signal for processing therein by the client engine.

The method and operation of the invention will be more fully understood by reference to the flow charts of FIG. 3 through FIG. 5. The order of acts as shown in FIG. 3 through FIG. 5 and described below are only exemplary, and should not be considered limiting.

Referring now to FIG. 3, as well as FIG. 1 and FIG. 2, there is shown the processes associated with the client engine 30 in accordance with the invention. As described above, the client engine 30 is a software application or embedded system operating within a client media player for identifying media content played via the client media player.

At process 100, the client engine 30 is initiated. The client engine 30 may be initiated by the user of client media player 14 or may initiate automatically upon the recognition of media content being played via the sound card 20 and/or the video card 24. Box 110 is then carried out.

At box 110, the intercept unit 36 is initiated. As described above, the intercept unit 36 carries out the operation of monitoring media content played on client media player 14 (typically via sound card 20 and/or video card 24). The processes of the intercept unit 36 are described more fully below in conjunction with FIG. 4. After the intercept unit 36 is initiated, box 120 is then carried out.

At box 120, a user request for media information is received via user interface 38. This request is communicated from the user interface 38 to the sampling unit 34 for further processing. Box 130 is then carried out.

At box 130, the sampling unit 34 creates a media sample from the media data contained in the FIFO buffer 40. The media sample created by the sampling unit 34 comprises a "digital fingerprint" using conventional digital signal processing known in the art. As noted above, a sound file may be sampled according to its acoustic/perceptual features over time. Box 14 is then carried out.

At box 140, the sampling unit 34 transmits the media sample created from box 130 to the lookup server 12 for content identification and content-related information. In the illustrative system depicted in FIG. 1 and FIG. 2, the media sample is first wrapped in a transport protocol and then communicated over IP (HTTP) via network interface 28. Box 150 is then carried out.

At box 150, the client media player 14 receives from the lookup server 12 the content-related information requested in box 140. The process for generating the content-related information by the lookup server 12 is described in further detail below in conjunction with FIG. 5. This content data is first received via the network interface 28, unwrapped using the appropriate transport protocol and then communicated to the client engine 30. In the client engine 30, the user interface 38 receives the content-related information, and parses the data according to the appropriate format (XML tags, for example) transmitted by the lookup server 12. Box 160 is then carried out.

At box 160, the user interface 38 presents the content-related information to the user via video card 24 and display 26, or other display device such as an LCD screen, or standard broadcast television. As described above, this content-related information may include such information as song title, artist, and album name, for example. The content-related information may also include product fulfillment information, such as how and where to purchase media containing the media sample, advertising banners, and/or promotional offers, for example.

Referring now to FIG. 4, there is generally shown the processes associated with the media intercept unit 36 in accordance with the invention. In general, the media intercept unit 36 maintains a FIFO buffer of predetermined size (150 seconds, for example) of media content played via client media player 14, 52a through 52n.

At process 200, the intercept unit 36 is initiated. This is carried out from box 110 of FIG. 3, during the start up of the client engine software 30. Box 210 is then carried out.

At box 210, the intercept unit 36 monitors the media hardware devices of the client media player 14. As described above, the media hardware devices may comprise a sound card 20 and/or a video card 24. Other hardware devices suitable for playing media content are also monitored by the intercept unit 36. Diamond 220 is then carried out.

At diamond 220, the intercept unit 36 determines whether any media hardware devices are playing media content. If the intercept unit 36 determines that media content is current being played, diamond 230 is carried out. Otherwise box 210 is repeated.

At diamond 230, the intercept unit 36 determines whether the FIFO buffer 40 is currently full. If the buffer is determined to be full, box 240 is carried out. Otherwise, box 250 is carried out.

At box 240, the intercept unit 36 has determined that all the buffer 40 is full and deletes the older sample in the buffer. As noted above, the FIFO buffer 40 is commonly configured with a predetermined size. For example, if the sampling rate is 22 KHz (HiloHertz), the olderst $1/22,000$th of a second sample would be deleted, and the newest $1/22,000$th of a second sample would be added to the buffer. Using this method, the intercept unit 36 is able to maintain the most recent one hundred fifty (150) seconds of media content played via client media player 14. Box 250 is then carried out.

At box 250, the intercept unit 36 stores the media content currently being played on client media player 14 into the FIFO buffer 40. Box 210 is then repeated to continue monitoring media hardware devices.

Referring now to FIG. 5, there is generally shown the processes associated with the server engine 16 and the lookup server 12 in accordance with the invention. It is noted that the lookup server 12 is structured and configured to handle a plurality of requests from a plurality of client media players as depicted in FIG. 2 above.

Prior to box 300 as described below, the in-memory structure 47 is populated with reference media samples. Upon initialization of the lookup unit 42, the collection of reference samples from the media database 46 is stored in the in-memory structure 47.

At box 300, the lookup server 12 receives a media sample request from one of the client media players 14, 52a through 52n. As described above, such requests are generally communicated over an Internet connection 32, although any suitable network connection may also be used. The request is first received via network interface 17 via the IP (HTTP) protocol. An appropriate transport protocol unwraps the message and communicates the request to the server engine 16 for processing. Box 310 is then carried out.

At box 310, the lookup unit 42 sequentially compares each reference sample in structure 47 to the media sample provided by the media player 14, 52a through 52n, as described above. The lookup unit will cut the media sample into a series of overlapping frames, each frame the exact size of the particular reference sample under examination. The lookup unit 42 will then compare the reference sample to every possible "frame" of information within the media sample and compute a "distance" between each frame and the reference sample. This process repeats for each reference sample. Diamond 320 is then carried out.

At diamond 320, the lookup unit 42 determines whether a match was obtained. As noted above, the reference sample which has the smallest distance to any frame in the sample is considered for a match. If the distance is below a predefined threshold, a match is considered to be found. If a match is determined, box 330 is then carried out. Otherwise box 350 is carried out.

At box 330, the media sample from box 300 matches a corresponding record in the media database 46, and the lookup unit 42 retrieves the content-related information associated with the matching record in the media database 46. As noted above, this content-related information may include such information as song title, artist, album name, for example as well as other information such as product fulfillment information. Box 340 is then carried out.

At box 340, the content-related information obtained in box 330 is transmitted to the client media player submitting the media sample request in box 300. In the preferred embodiment, this transmission is carried out over the Internet using the IP (HTTP) protocol. Box 370 is then carried out to generate a log.

At box 350, the lookup unit 42 has determined that the media sample from box 300 does not match any reference sample in the in-memory structure 47. Box 360 is then carried out.

At box 360, a notice indicating that the requested information is not available is transmitted to the requesting client media player of box 300. Box 370 is then carried out.

At box 370 the log process is initiated. This log process involves tracking the user and related-media information associated with the request of box 300. The log unit 44 maintains a plurality of information related to the requests made by the user including, for example, media type, genre or category. This user information is maintained in the log database 48 and may be used for various marketing strategies, including analyzing user behavior, for example.

Accordingly, it will be seen that this invention provides an apparatus and method which provides real-time media content-related information to users viewing media content over a personal computer, or other data processing means. Although the description above contains many specificities, these should not be construed as limiting the scope of the invention but as merely providing an illustration of the presently preferred embodiment of the invention. Thus the scope of this invention should be determined by the appended claims and their legal equivalents.

What is claimed is:

1. A method for identifying media content presented on a client media player comprising:

creating an analytical representation from a segment of media content of a recording presented on said client media player, wherein said media content is audio data for a song, said segment of said media content is a predetermined portion of said media content present on said media player and said analytical representation is a digital fingerprint of said segment measuring acoustical/perceptual features of said segment;

comparing said analytical representation to a collection of analytical representation of reference sampled media content to obtain content-related data from said collection of analytical representations of reference sampled media content wherein said content related data includes at least one of a group consisting of a song title, artist performing said song, and title of an album including said song; and presenting said content-related data on said client media player.

2. The method of claim 1, wherein said collection of analytical representations of reference sampled media content is maintained in a lookup server in communication with said client media player, said method further comprising:

transmitting said analytical representation segment to a lookup server, before comparing said analytical representation segment to said collection of reference sampled media content; and transmitting said content-related data to said client media player, before presenting said content-related data.

3. The method of claim 1 further comprising receiving a user-initiated command to identify said media content before creating an analytical representation of a segment of said media content.

4. The method of claim 1 wherein said creating an analytical representation of a segment of said media content is carried out periodically.

5. The method of claim 1 wherein said creating an analytical representation of a segment of said media content is carried out continuously.

6. The method of claim 1 wherein said creating an analytical representation of a segment of said media content further comprises maintaining a fixed buffer of media content presented on said client media player.

7. The method of claim 1 wherein said transmitting said analytical representation to a lookup server is carried out over an Internet connection.

8. The method of claim 1 wherein said transmitting said content-related data to said client media player is carried out over an Internet connection.

9. A program storage device readable by a machine, tangibly embodying a program of instructions executable by the machine to perform a method of identifying media content presented on a client media player, said method comprising:

creating an analytical representation from a segment of media content of a recording presented on said client media player, wherein said media content is audio data for a song, said segment of said media content is a predetermined portion of said media content present on said media player and said analytical representation is a digital fingerprint of said segment measuring acoustical/perceptual features of said segment;

comparing said analytical representation to a collection of analytical representation of reference sampled media content to obtain content-related data from said collection of analytical representations of reference sampled media content wherein said content related data includes at least one of a group consisting of a title of said song, an artist name of an artist performing said song; and presenting said content-related data on said client media player.

10. The program storage device of claim 9, wherein said collection of analytical representations of reference sampled media content is maintained in a lookup server in communication with said client media player, said method further comprising:

transmitting said analytical representation to a lookup server, before comparing said sample to said collection of analytical representations of reference sampled media content; and transmitting said content-related data to said client media player, before presenting said content-related data.

11. In a network having at least on client media player operatively coupled for communication with a lookup server, a system for identifying media content presented on the client media player comprising:

a client engine executing within the client media player, said client engine structured and configured to create an analytical representation from a segment of media content of a recording presented on said client media player, wherein the media content is audio data for a song played on said client media player and communicate said sample to said lookup server wherein said segment of said media content is a predetermined portion of said media content present on said media player and said analytical representation is a digital fingerprint of said segment measuring acoustical/perceptual features of said segment;

a collection of analytical representation of reference sampled media content containing a plurality of analytical representations of sampled media content, each associated with corresponding content-specific information including at one from the group consisting of title of a song, an artist performing said song, and an title of an album including said song; and a server engine executing with said lookup server connected to said collection of analytical representation of sampled media content, said server engine structured and configured to receive said analytical representation from said client media player and compare said received analytical representation with said plurality analytical representations of sampled to media content in said collection of analytical representations of reference sampled media content to query and ascertain content-specific information related to said received analytical representation, said server engine further structured and configured to transmit said content-specific information to said client media player.

12. The system of claim 11 wherein said client engine is further structured and configured to display said content information.

13. In a network having at least on client media player operatively coupled for communication with a lookup server, a client engine executing within the client media player for identifying media content presented on the client media player comprising:

an interrupt unit structured and configured to monitor the client media player for media content presented thereon, wherein said media content is audio data for a song;

a sampling unit structured and configured to generate an analytical representation of segment from media content of a recording presented on said client media player, wherein the media content is data of a recording from said media content monitored by said interrupt unit and transmit said analytical representation to said lookup server wherein said segment of said media content is a predetermined portion of said media content present on said media player and said analytical representation is a digital fingerprint of said segment measuring acoustical/perceptual features of said segment; and a user interface structured and configured to receive content information related to said analytical representation from said lookup server and presenting said content information is at least one from a group consisting of a title of said song, an artist performing said song, and an album including said song.

14. The client engine of claim 13, wherein said user interface is further structured and configured to receive user-requests from a user of said client media player, said sampling unit further structured and configured to generate said analytical representation upon receipt of said user request.

15. In a network having at least on client media player operatively coupled for communication with a lookup server, a server engine executing within the lookup server for identifying media content presented on the client media player comprising:

a collection of analytical representations of reference sampled media content containing a plurality of analytical representations of sampled media content wherein said media content is a song, each associated with corresponding content-specific information; and a lookup unit coupled to said collection of analytical representations of reference sampled media content, said lookup unit structured and configured to receive an analytical representation from a segment of media content of a recording presented on said client media player, wherein the media content is data for a song played on said client media player, said segment of said media content is a predetermined portion of said media content present on said media player and said analytical representation is a digital fingerprint of said segment measuring acoustical/perceptual features of said segment and compare said received analytical representation with said plurality of analytical representations of sampled media content in said collection of analytical representations of reference sampled media content to query and ascertain content information related to said received analytical representation wherein said content information is at least one from a group consisting of a title of said song, a name of an artist performing said song, and a title of an album including said song, said server engine further structured and configured to transmit said content information to said client media player.

* * * * *